D. K. Croffut's IMPROVEMENT IN HORSE YOKE.

No. 74316

PATENTED
FEB 11 1868

WITNESSES
John H. Shumway
A. J. Tibbits

D. K. Croffut
INVENTOR
By his Attorney
John E. Earle

United States Patent Office.

D. K. CROFFUT, OF BIRMINGHAM, CONNECTICUT.

Letters Patent No. 74,316, dated February 11, 1868.

IMPROVED HORSE-YOKE.

The Schedule referred to in these Letters Patent and making part of the same

TO ALL WHOM IT MAY CONCERN:

Be it known that I, D. K. CROFFUT, of Birmingham, in the county of New Haven, and State of Connecticut, have invented a new Improvement in Horse-Yokes; and I do hereby declare the following, when taken in connection with the accompanying drawings and the letters of reference marked thereon, to be a full, clear, and exact description of the same, and which said drawings constitute part of this specification, and represent, in—

Figure 1:
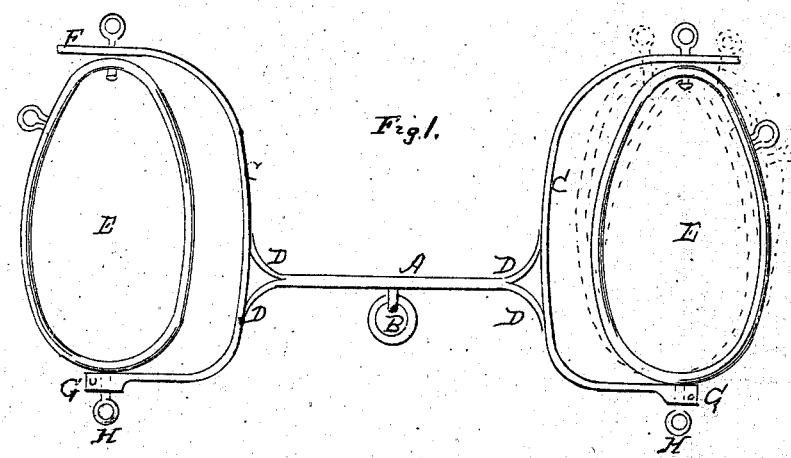
Figure 2:
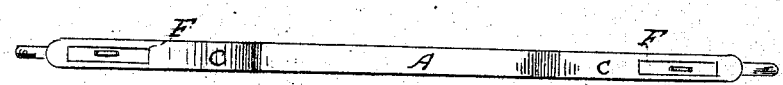

Figure 1, a front view, and in

Figure 2 a top view.

This invention relates to an improvement in a yoke for coupling horses, and consists, first, in the construction of a solid hame, and also in the peculiar construction of the yoke; and in order to the clear understanding of my invention, as well as to enable others to construct the same, I will proceed to a description thereof, as illustrated in the accompanying drawings.

A is the connecting-bar, provided with a ring, B, or other convenience for attaching the yoke to the thing to be drawn, each end formed into a bow, C, braced in its construction by curved attachments, D. E, the hames, formed solid, without joint, or, as it were, in a single piece, to slip on over the collar of the horse and set into a slot, F, at the top, and secured at the bottom, G, in any convenient manner, so that they may turn in their bearing G and also in the slot, to give freedom to the movement of the horses, and resting in the slot at the top, so as to move freely to the right or left, as denoted in blue and red, (fig. 1,) to permit the free movement up and down of either hame.

To yoke two animals, place one of the hames E upon each, then insert the eye upon the top of the hame into the slot, and the other end into the bearing G, and secure thereto in any convenient manner, then attach the yoke to the thing to be moved, in any convenient manner, according to the nature of the work to be done.

The advantages of this yoke for farming purposes are obvious; and, first, in that of ploughing, or like purposes, where whiffle-trees are a source of great annoyance, they are dispensed with, and a chain extending from the yoke to the plough-beam in like manner as when ploughing with oxen, and in all places where there is no pole necessary, the advantages of the yoke are so obvious that mention need not here be made.

By the use of the yoke all inclination of the animals to crowd is avoided, and the work performed is far more comfortable for the animals than by the ordinary traces.

Hold-backs, if desired, are attached to the eye H upon the hame, so that wherever the yoke is used traces and whiffle-trees are unnecessary.

I do not broadly claim a yoke constructed with bows pivoted at the top and bottom, as such may be seen in the patent of Gideon Hotchkiss, August 31, 1837.

Having thus fully described my invention, what I claim as new and useful, and desire to secure by Letters Patent, is—

1. A solid or continuous hame, constructed so as to slip on over the collar, substantially as and for the purpose specified.

2. The combination of the yoke E with bows C, provided with the slots F, substantially as and for the purpose set forth.

D. K. CROFFUT,

Witnesses:
S. C. BLAIR,
JOHN BLAIR.